United States Patent
Tang

(10) Patent No.: US 7,250,451 B2
(45) Date of Patent: *Jul. 31, 2007

(54) RECYCLED RUBBER PROCESSING AND PERFORMANCE ENHANCEMENT

(75) Inventor: Ying Tang, Jacksonville, FL (US)

(73) Assignee: American Rubber Technologies, Inc., Jacksonville, FL (US)

( * ) Notice: Subject to any disclaimer, the term of this patent is extended or adjusted under 35 U.S.C. 154(b) by 534 days.

This patent is subject to a terminal disclaimer.

(21) Appl. No.: 10/796,531

(22) Filed: Mar. 9, 2004

(65) Prior Publication Data

US 2005/0203197 A1    Sep. 15, 2005

(51) Int. Cl.
*C08J 11/04* (2006.01)

(52) U.S. Cl. ........................... 521/41; 521/41.5

(58) Field of Classification Search ............. 521/40, 521/40.5, 43, 41; 524/41.5; 264/37.1
See application file for complete search history.

(56) References Cited

U.S. PATENT DOCUMENTS

| | | | |
|---|---|---|---|
| 4,211,676 A | 7/1980 | Watabe et al. | |
| 4,481,335 A | 11/1984 | Stark, Jr. | |
| 5,602,186 A | 2/1997 | Myers et al. | |
| 5,770,632 A * | 6/1998 | Sekhar et al. | 521/41.5 |
| 5,891,926 A | 4/1999 | Hunt et al. | |
| 6,062,283 A | 5/2000 | Watanabe et al. | |
| 6,387,966 B1 * | 5/2002 | Goldshtein et al. | 521/41 |
| 6,590,042 B1 * | 7/2003 | Tang | 525/332.6 |
| 6,632,918 B1 | 10/2003 | Matsushita et al. | |
| 6,924,319 B1 * | 8/2005 | Alsdorf et al. | 521/40 |

OTHER PUBLICATIONS

Kenzo Fukumori and Mitsumasa Matsushita; "Material Recycling Technology of Crosslinked Rubber Waste"; R&D Review of Toyota CRDL, vol. 38, No. 1; 2003; pp. 39-47.

* cited by examiner

*Primary Examiner*—Katarzyna Wyrozebski

(57) ABSTRACT

A process for reclaiming sulfur-cured, vulcanized rubber by combining finely ground scrap vulcanized rubber within a specialized, twin-screw extruder capable of providing strong shearing and just-on-time mixing; adding a reclaiming agent to the extruder; and masticating the rubber scrap and reclaiming agent within the extruder until the rubber scrap is devulcanized. The present invention also discloses a unique composition of reclaiming agent, which preferably includes the following compounds: accelerators TBBS, ZMBT, MBT, and TMTM; activators zinc oxide and stearic acid; and zinc salts of fatty acids and sulfur. The reclaimed rubber is suitable for use in producing high-grade, rubber products without adding a binder, or for combining with fresh rubber compounds to produce high-specification rubber products.

18 Claims, 2 Drawing Sheets

RECYCLED RUBBER PROCESSING AND PERFORMANCE ENHANCEMENT

CROSS-REFERENCE TO RELATED APPLICATIONS

This application claims priority of International Application No. PCT/US2002/031782, entitled "RECYCLED RUBBER PROCESSING AND PERFORMANCE ENHANCEMENT", filed on Oct. 2, 2002. The above-listed application is commonly assigned with the present invention and is incorporated herein by reference as if reproduced herein in its entirety. This Application claims the benefit of U.S. Pat. No. 6,590,042, Ser. No. 09/970,177, filed Oct. 3, 2001 and which was co-pending with the above-referenced PCT application.

TECHNICAL FIELD OF THE INVENTION

The present invention generally relates to the field of rubber recycling. More particularly, the invention pertains to reclaiming vulcanized rubber, such as tire rubber, so that the reclaimed rubber may be recycled.

BACKGROUND OF THE INVENTION

Useful rubber products, such as automotive tires, are usually molded from vulcanized rubber. In general, vulcanization is the chemical treatment of a hydrocarbon rubber polymer such that the long polymer chain molecules cross-link with molecules of a cross-linking agent. The reaction transforms the soft, weak, plastic polymeric material into relatively strong, elastic material resistant to deterioration and permanent deformation. One of the most common cross-linking agents is sulfur. When sulfur or sulfur donors are used as the cross-linking agent, sulfur or sulfur donors and an accelerator or several accelerators, such as a primary and a secondary accelerator are mixed with the rubber polymer. The mixture is subjected to pressure and heat, resulting in the polymer chain molecules cross-linking with sulfur molecules.

The addition of sulfur provides beneficial physical properties of a final rubber product, such as strength, elasticity, and durability. Unfortunately, the benefits achieved present a problem when attempting to recycle vulcanized rubber. The cross-linked rubber polymer cannot be reclaimed into a useful product merely by heating and reprocessing. The strength of the cross-linked bonds prevents the vulcanized rubber from melting, dissolving, or binding with a virgin rubber matrix. This has, in part, facilitated the creation of a scrap tire problem in the United States.

Vulcanized rubber is the source of one of the most serious waste product problems in the United States. Millions of tons of natural and synthetic rubbers are produced and consumed every year. This volume of production yields a substantial amount of scrap rubber, including used tires. Scrap tires constitute a large percentage of the total scrap rubber stockpiled and discarded annually. For example, billions of tires have been discarded with approximately 273 million tires discarded annually. Yet, only a fraction of waste tires generated annually is truly recycled, most are burned as fuel.

The enormous quantity of scrap rubber has created a serious disposal and environmental problem. In addition to disposal concerns, waste tires pose serious fire and safety hazards. The problems and concerns continue to mount as an increasing number of landfills refuse to accept scrap rubber waste. Approximately a dozen states have banned all scrap tires from their landfills, and about twice that number, allow only processed tires in the landfills.

The demand for satisfactory recycling processes is on the rise as the availability of landfills diminishes. A number of approaches have been employed to try to solve the waste rubber problem. One method involves shredding and grinding tires into small crumbs and then binding the rubber with polyurethane into low-performance products such as rubber mats, gaskets, and vehicle mud flaps. Crumb rubber has been used as an additive in road asphalt, as ground coverings for surfaces such as parking lots and playgrounds, and as fill under road surfaces or turf such as athletic fields and golf courses. In addition, scrap rubber has been burned as fuel and subjected to pyrolysis to produce oil that is used as a fuel. However, these approaches generally produce a low quality rubber product, or present additional pollution problems.

When using crumb rubber to form new products, the crumb may be used as filler for mixing with virgin rubber. Generally, however, only low percentages of crumb filler may be added before the properties of the compound begin to degrade. The major drawback of conventional crumb to is that the cross-link bonds created by the vulcanization process are very strong. This results in rubber compound molecules having a "memory" effect. The memory effect enables rubber items to regain their original shape after being subjected to a deforming force. For example, a rubber band that is stretched returns to its original shape. Even when vulcanized rubber is processed into crumbs, the rubber molecules retain much of their physical properties. The strength of the cross-link bonds makes binding of the vulcanized rubber within a virgin rubber matrix difficult— the bonding between the new rubber and the vulcanized crumb is weak. Thus, only about 3 to 4 percent by weight of reclaimed rubber can be used in the manufacture of new tires.

More crumb may be added as filler if the surface of the crumb is modified to enhance the ability of the crumb to be incorporated into the mix. For example, the rubber molecule chains on the surface of the crumb may be chemically modified or the surface may be coated to help the rubber crumb blend into the mix. However, the process does not change the inert nature of the crumb core, and the amount of surface-modified crumb that can be added as filler is still limited.

Another approach to recycling rubber waste is devulcanization of crumb rubber. Devulcanization is intended to depolymerize rubber molecules or break the polysulfide linkages without removing the combined sulfur. Methods for devulcanization may include mechanical shear, high-energy radiation, chemical processing, and thermo-mechanical processing. Although vulcanization is not completely reversible, partial devulcanization results in a decreased resistance to deformation and allows an increased amount of devulcanized crumb to be added to fresh rubber mixes than can be added using unmodified or untreated crumb. Devulcanized or reclaimed rubber can be revulcanized with or without the addition of natural or synthetic rubbers or binders.

Current devulcanization or reclaiming methods have several drawbacks. For example, current methods may use high temperatures (e.g., 150.degree. C. to 250.degree. C.) to digest the elastomeric material being recycled, and may require stirring for many hours (e.g., 5 to 12 hours). This results in a high consumption of energy and degradation of the material being reclaimed. For example, the intense heat and mechanical shear actions of a thermo-mechanical process may cause some polymeric chain backbone to break down. In addition, because this process does not use chemicals, it is not possible to selectively cleave targeted polysulfidic bonds. Some processes, such as solvent extraction, utilize large quantities of chemicals or solvents that can damage the environment, or involve complicated solvent or chemical recovery and treatment. Still other reclamation processes, such as microwave or ultrasonic processing, employ relatively complicated equipment that is difficult to obtain and difficult to operate efficiently for industrial production.

Rubber reclaimed using such approaches tends to have poor physical properties. For example, conventionally reclaimed rubber may have tensile strength of about 5 to 6 MPa, while natural rubber may have tensile strength over 20 MPa.

For some products that do not require high strength, such as rubber mats and road markers, larger percentages of vulcanized rubber crumb from scrap tires may be used. However, the presence of recycled rubber, either treated or untreated, in a mixture with fresh rubber compounds, may adversely affect the physical properties of the final product. As a result, reclaimed rubber is typically not used in the manufacture of automobile tires.

Therefore, a need still exists for a method of devulcanization that permits a greater portion of vulcanized scrap rubber to be re-used, while still meeting required specifications of the finished product.

SUMMARY OF THE INVENTION

The present invention enables a partial devulcanization process, including use of a specialized extruder and reclaiming agent, which alleviates the drawbacks of currently employed methods of reclaiming scrap rubber.

The present invention involves reclaiming elastomeric products vulcanized by the addition of sulfur or sulfur donors, such as tires made from natural or synthetic rubber, through a partial devulcanization and reactivation process such that the reclaimed material may be recycled. The process of the present invention uses a unique combination of non-toxic, commonly used rubber chemicals and a specially designed twin-screw extruder to reclaim vulcanized rubber scrap or waste. According to one aspect of the present invention, the chemical formula, combined with the actions of the extruder that provide the appropriate shear, pressure, dwell time, and temperature, devulcanizes both natural and synthetic sulfur-cured rubbers. The process selectively breaks sulfur cross-link bonds in the vulcanized rubber scrap, modifying the molecular-level cross-links and providing significant relinking and revulcanizing attributes that increase the recyclability of rubber scrap without substantial degradation of physical properties. The devulcanized rubber can be revulcanized without adding any other binders to produce rubber products having satisfactory physical properties. The devulcanized rubber can also be blended with fresh rubber compounds to provide rubber products having good physical properties.

The advantages of the present invention overcome many of the drawbacks of the current reclaiming processes. The process of the invention disclosed herein can be performed in a matter of several minutes thereby consuming much less energy and retaining more product physical properties compared with conventional thermo-mechanical processes. The process of the invention disclosed herein utilizes very small quantities of non-toxic chemicals with no environmental impact and no need to recover after treatment. Moreover, the process utilizes chemicals in small percentages. The safe and efficient chemical formula taught herein results in no additional odors and low impact on the recipe and process for the replacement of virgin rubber in the original product.

The first step of the process involves reducing factory scrap rubber or used tires to fine particles or crumb. Next, the crumb is treated with a reclaiming agent inside a twin-screw extruder. The small particulate exhibit high surface area to volume ratios, enabling optimal surface interaction between the reclaiming agent and the rubber particles. The process of the present invention does not require complex heating or cooling equipment, nor does it use liquids or slurries that tend to clog extruders. The twin-screw extruder has specially designed cutting and stirring tools that create extreme shear conditions that open or expose many vulcanized surface cross-links. The extruder quickly and thoroughly mixes and coats rubber crumb with reclaiming agent.

Major components of the reclaiming agent include sulfur; accelerators selected from zinc mercaptobenzothiazole (ZMBT) and derivatives such as 2-mercaptobenzothiazole (MBT), sulphenamides such as N-tert-butyl-2-benzothiazole sulphenamide (TBBS), and thiurams such as tetramethylthiuram monosulfide (TMTM); and activators such as zinc stearate and zinc oxide. The reclaiming agent is made into a fine powder to facilitate maximum contact between the agent and rubber crumb in the extruder.

The process of the present invention works for most sulfur-cured compounds such as natural rubber (NR), polybutadiene (BR), styrenebutadiene (SBR), ethylene-propylene-diene-terpolymer (EPDM), neoprene (CR), and nitrile (NBR). Reclaimed rubber produced by the process can be revulcanized as a stand-alone product without adding any binders and still retain most of the rubber compound's physical properties, or the properties of the reclaimed rubber can be enhanced by adding a little fresh rubber. In one embodiment of the present invention, devulcanized whole tire crumb can be milled and compounded with conventional curatives and cured for 10 minutes at 320.degree. F. to provide a revulcanized product having typical physical properties of 700 psi for tensile strength, 180% for elongation, and 71 pli for tear strength. If factory scrap instead of whole tire crumb is processed, the product may have 2000 psi for tensile strength, 300% for elongation, and 150 pli for tear strength. In addition, such reclaimed rubber can be recycled in high concentrations with identical fresh compounds, or blended with similar but not exact compounds in moderate concentrations to provide even better physical properties.

In sum, the amount of reclaimed rubber used can be varied to meet almost any masterbatch specification. The resulting revulcanized properties depend on the characteristics of the feedstock's original compound. For example, industrial scrap rubber provides better characteristics than post-consumer scrap. In addition, some internal laboratory work is usually necessary to optimize the reclaimed rubber to meet particular requirements. For example, a necessary adjustment may be to reduce viscosity with an additive such as oil.

From the foregoing, it will be apparent to the reader that a primary object of the present invention is to provide a process for the manufacture of devulcanized rubber from vulcanized scrap and waste rubber. More particularly, the process uses a reclaiming agent and a specialized twin-screw extruder to thoroughly mix reclaiming agent with rubber crumb to selectively treat sulfur cross-links in such rubber crumb without substantially degrading the backbone polymer while recovering a reusable rubber polymer.

It is also an object of the present invention to provide a process for devulcanization that permits a greater portion of devulcanized scrap rubber to be reused as partial replacement for virgin rubbers in the compound formulations without deteriorating the quality of the resulting rubber product.

It is a further object of the present invention to provide a process for devulcanization of vulcanized rubber scrap that reduces manufacturing costs by reducing processing times and energy consumed while using common, non-toxic vulcanization chemicals.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above and defined by the enumerated claims may be better understood by referring to the following detailed description, which should be read in conjunction with the accompanying drawings. This detailed description of a particular embodiment, set out below to enable one to build and use a particular implementation of the invention, is not intended to limit the enumerated claims, but to serve as a particular example thereof. Those skilled in the art should appreciate that they may readily use the concepts and specific embodiment disclosed as a basis for modifying or designing other methods and systems for carrying out the same purposes of the present invention. Those skilled in the art should also realize that such equivalent assemblies do not depart from the spirit and scope of the invention in its broadest form.

Overview

Figure 1:
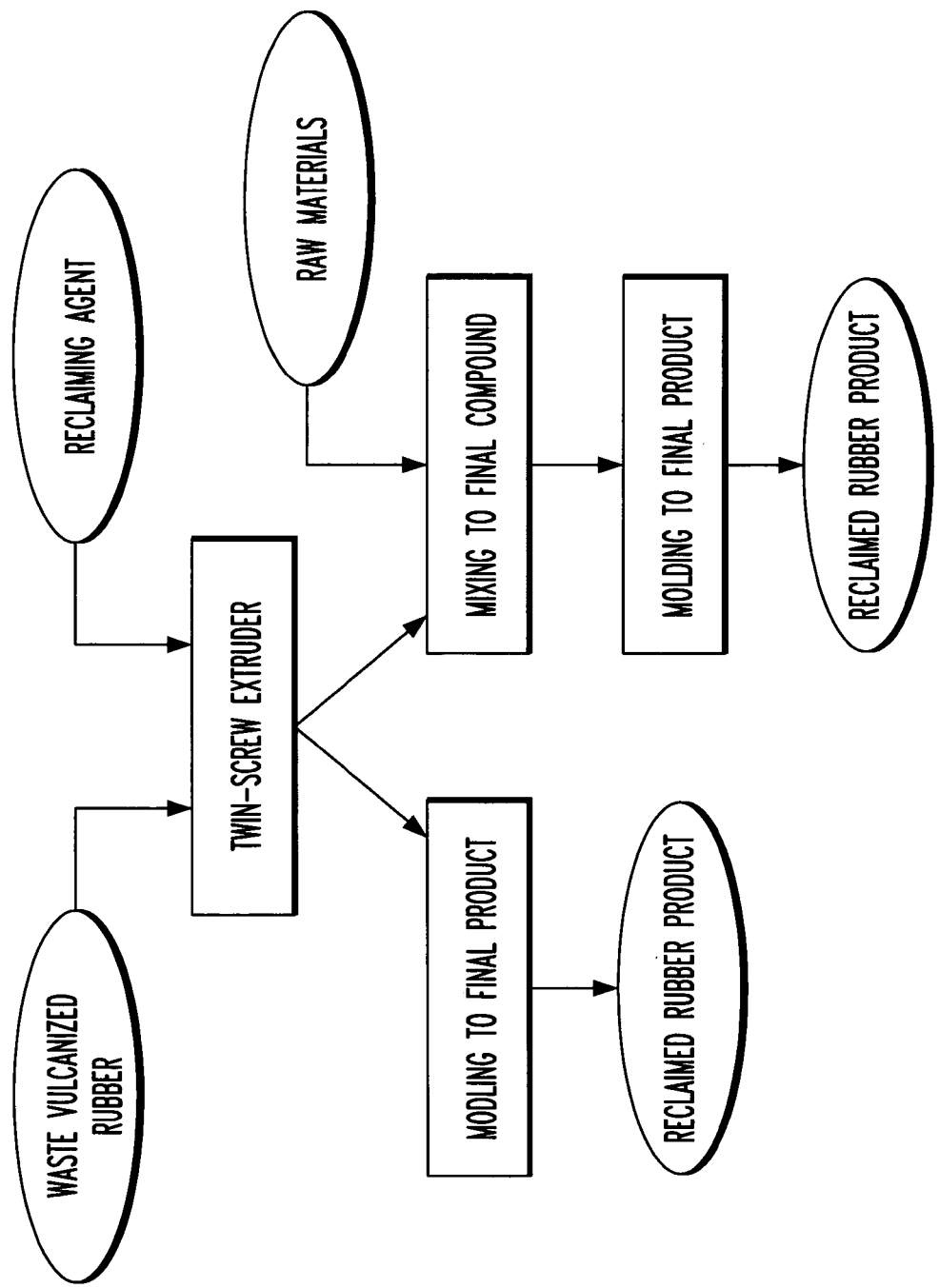
FIG. 1 is a diagrammatic illustration of the process of the present invention.

In accordance with a process of the present invention, vulcanized rubber scrap, such as discarded tires and industrial waste is devulcanized by exposing prepared rubber crumb to a novel reclaiming agent within a specialized twin-screw extruder, as shown in FIG. 1. The combination of the reclaiming agent and extruder actions, which produce the appropriate pressure, temperature, dwell time, and shear stress, sever the sulfur cross-links in the crumb rubber with little breakup of the polymer main chain. The process converts vulcanized rubber scrap into a reusable elastomeric material having many properties of fresh elastomers in similar compounds.

The process starts by preparing scrap rubber for reclaiming. If tires are the scrap being ground, then wire and fiber reinforcements, if any, must be removed. Illustrative types of vulcanized scrap contemplated by the present invention include NR, SBR, BR, CR, NBR, and EPDM. However, scrap rubber derived from other types of sulfur-cured rubber may be used in the present invention. The scrap rubber is finely ground into a fine crumb using conventional crushing and grinding techniques, which may include cryogenic techniques. To ensure a homogenous blend, rubber scrap is ground to a particle size of at least approximately 20 mesh, but about 40 to about 60 mesh or even finer is preferred to improve the physical properties (e.g., elongation at break and tensile strength) of a revulcanized final product. Rubber scrap may be shredded and ground at ambient temperatures. Preferably, such scrap is cryogenically frozen first and then ground, making it easier to grind to fine crumb resulting in better flow characteristics.

After the scrap rubber is ground, it is fed into a specially designed extruder for mixing with reclaiming agent in such extruder at established temperatures and for specific periods of time. Temperature and time are dependent upon the type of scrap rubber used and properties desired in a final product. The present invention preferably uses a one-stage mixing process, however, batch mixing is possible with different processing equipment such as a banbury internal mixer or two-roll mill.

Figure 2:
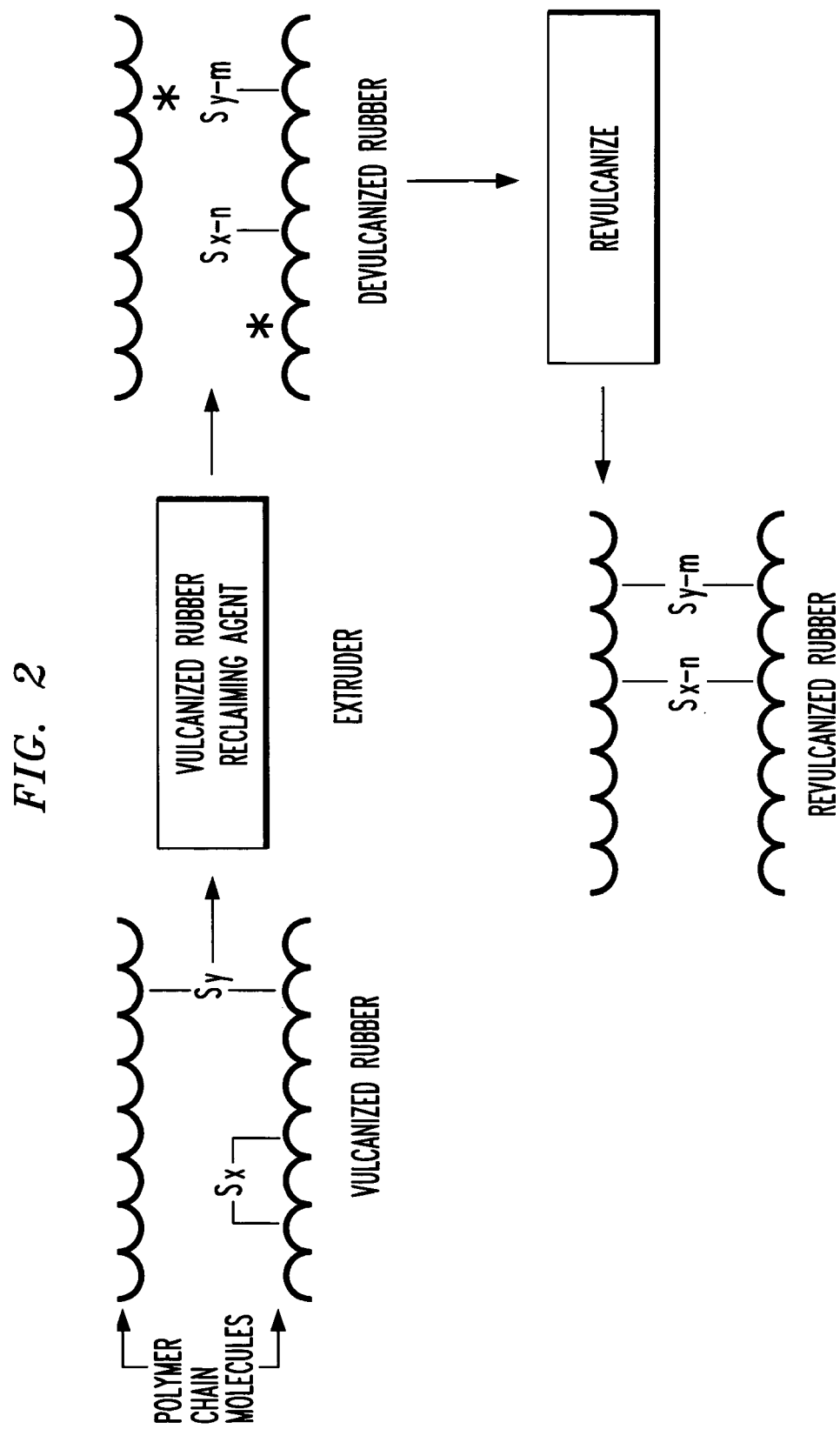
FIG. 2 is a diagrammatic illustration of vulcanization and devulcanization at the molecular level.

During vulcanization where the cross-linking agent is sulfur or sulfur donors, long polymer chain molecules cross-link with sulfur molecules, as illustrated in FIG. 2. In one embodiment of the present invention, a reclaiming agent, combined with the actions of the extruder, breaks the long sulfur cross-link bonds in vulcanized rubber, modifying the molecular-level cross-links without substantial degradation of the polymer backbone. The process of the present invention significantly reduces the number of multiple sulfur cross-links and chemically caps such cross links for relinking during a subsequent rubber manufacturing process. Addition of sulfur in the reclaiming agent aids subsequent relinking.

Because some sulfur cross-links are not broken, certain properties of devulcanized rubber are affected. For example, vulcanized rubber products manufactured by replacement of virgin rubber with devulcanized crumb produced by the present invention provide about 50 to 85% of the original tensile strength of similar, new elastomers that are compounded and vulcanized. Devulcanized crumb of the present invention may be blended with fresh compounds, as shown in FIG. 1, to meet higher required product performances.

Extruder

The crumb with reclaiming agent may be processed using standard equipment in the rubber industry, such as a standard cracker mill or similar batch processing equipment. However, this equipment is very labor intensive to operate and provides low throughput. Other machines that may be used include, banbury internal mixers. In a preferred embodiment of the present invention, processing takes place in a specialized twin-screw, high-shear, high-pressure, temperature-controlled extruder that enables continuous devulcanization of rubber. A computer, preferably a programmable logic controller (PLC), controls the extruder. The rubber crumb is placed in the extruder, and the reclaiming agent is placed in a feeder within the extruder. The PLC directs the feeder to add 1 to 2 parts by weight of reclaiming agent to one hundred parts of rubber crumb. The exact amount of reclaiming agent added to the crumb depends on components of the rubber being processed and the product physical properties desired.

Table 1 provides specification data for the extruder of the present invention. The extruder has an electric motor that drives a purpose-designed gearbox with two independently adjustable, counter-rotating output shafts that drive the mechanism. Once started, the on-board computer controls the extruder. The devulcanization process of the present invention takes place in four modular, water-cooled chambers. The screw design offers a flexible array of processing tools that are easily changed. The crumb and reclaiming chemicals are transferred into internal chambers by the computer-controlled feeder, facilitating continuous operation. The computer allows the extruder to operate at predetermined mix rates and production levels that may be adjusted as necessary. The computer also monitors and controls all other extruder functions, including cooling water temperatures.

TABLE 1

| | |
|---|---|
| Production | Input up to 750 kg (1,650 lbs.) per hour (depending on feedstock) |
| Power | 3 Phase 90 kW (122 Hp) electric motor |
| Supply | 440 V, 60 Hz |
| Power Use | 450 Amp start-up; working average 150 Amp/hr |
| Drive | Includes overload clutch between motor and gearbox |
| Gearbox Lube | Upper bearings are oil injected |
| Oil Press/Temp | Monitored by computer (programmable logic controller (PLC)) |
| Gearbox | Input speed 1,440 or 1,728 rpm; output speed 205 or 275 rpm |
| Gear Drive | 2 output shafts are independently adjustable to each other |
| Tools | Hardened, tempered, tool steel |
| Chambers | 1 feed, 4 processing, 1 discharge |
| Chamber Construction | Nitrite surface treated and hardened tool steel |
| Cooling | Recirculated water flows through aluminum water jackets which encase the processing chambers |
| Temperature Controls | Water temperature monitored by five independent probes |
| Water | Minimum volume 120 L (32 gal) per minute |
| Water Flow | Monitored by PLC, manually adjustable by means of 4 valves |
| Feeder | PLC controlled and adjustable mix rate |
| System Control | Operating load of the main motor is measured by the PLC |
| Feeder Speed | Determined by the main motor load and controlled by the PLC |
| Control Panel | Keypad and LED display |
| Enclosure | Fully enclosed |
| Safety | Emergency stop switch, all moving parts enclosed |

The extruder of the present invention provides just-on-time mixing of rubber crumb and reclaiming chemicals, and the screw design creates strong mixing and shearing. Mechanical shear is required to expose crumb surfaces to reclaiming chemicals to break the multiple sulfur cross-links in the polymer chemicals. The crumb is constantly and intensively worked with temperatures between about 75.degree. C. and 85.degree. C., providing a pass through time of just one or two minutes. The process provides a uniform product with high production rates and no environmental pollution.

It is important to note that the purpose of the extruder is to provide a continuous process, controlled environment, rather than through batch processing. The mechanical shear and thermal actions provided by the extruder, combined with selective severing of long sulfur cross-links provided by reclaiming chemicals, enables chemical and physical actions on the surface as well as penetration of crumb particles in-depth. This results in more intensive mass transfer and breakdown of more polysulfidic bonds rather than polymer backbone. The combination of surface and in-depth treatment is better than surface treatment only, because the combination provides stronger physical and chemical actions on the crumb.

Processing time within the extruder, which occurs preferably at temperatures between about 75.degree. C. and about 85.degree. C., takes less than about 2 minutes, resulting in low energy consumption. Although friction within the extruder generates heat, internal chamber temperature is monitored and an appropriate temperature is maintained by cooling with water circulating through aluminum jackets encasing the processing chambers. Temperatures less than about 75.degree. C. will slow down the rate of devulcanization of rubber crumb, while temperatures exceeding about 85.degree. C. may sever the polymer backbone. After processing in the extruder, the devulcanized crumb is ready for manufacturing of stand-alone product or blends with virgin rubber compounds.

Reclaiming Agent

The process of the present invention uses harmless chemicals common to the rubber industry so that no environmental pollution is produced. In addition, no chemicals need to be separated or removed after processing is completed. The chemical mixture is in powder form, providing chemicals with a large surface area enabling maximum contact between reclaiming agent chemicals and fine mesh rubber crumb, which improves dispersion and expedites the devulcanization reaction. Reclaiming chemicals of the present invention include one or more accelerators, one or more activators, and sulfur to aid revulcanization. The chemical mixture does not require a natural or synthetic rubber binder.

In a preferred embodiment of the present invention the following accelerators are used: accelerators of the sulphenamide group, preferably N-tert-butyl-2-benzothiazole sulphenamide (TBBS); accelerators of the mercapto group, preferably zinc salt of 2-mercapto benzothiazole (ZMBT) and the derivative 2-mercaptobenzothiazole (MBT); and thiuram accelerators, preferably tetramethylthiuramic monosulphide (TMTM). An embodiment of the present invention also uses zinc salts of fatty acids; one or more activators such as stearic acid, methacrylic acid, and zinc oxide, preferably stearic acid and zinc oxide; and sulfur.

While ZMBT and MBT are preferred accelerators from the mercapto group, other accelerators from the mercapto group may be substituted, such as dibenzothiazyl-disulphide (MBTS).

While TBBS is a preferred accelerator from the sulphenamide group, other accelerators from the sulphenamide group may be substituted, including any of the following: N-cyclohexyl-2-benzothiazole sulphenamide (CBS), benzothiazyl-2-morpholine sulphenamide (MBS), 2-(N-morpholinyldithio)-benzothiazole, and morpholinyl-thiocarbonylsulphene morpholide.

While TMTM is a preferred thiuram accelerator, other thiuram accelerators may be substituted, including the following: tetraethylthiuram disulphide (TETD), tetramethylthiuram disulphide (TMTD), and tetrabenzylthiuram disulphide (TBTD).

Preferred amounts of reclaiming chemicals follow: TBBS preferably ranges from about 4% to about 10% by weight, more preferably about 6% by weight. ZMBT preferably ranges from about 4% to about 18% by weight, more preferably about 16% by weight. TMTM preferably ranges from about 3% to about 5% by weight, more preferably about 4% by weight. MBT preferably ranges from about 4% to about 18% by weight, more preferably about 8% by weight. Zinc salts of fatty acids preferably range from about 3% to about 6% by weight, more preferably about 4% by weight. Zinc oxide preferably ranges from about 1% to about 3% by weight, more preferably about 2% by weight. Stearic acid preferably ranges from about 1% to about 3% by weight, more preferably about 2% by weight. Finally, sulfur ranges from about 40% to about 65% by weight, more preferably about 58% by weight.

Thus, a preferred formulation for processing in the extruder comprises a mixture of 100 parts of rubber crumb combined with between 1 and 2 parts of reclaiming agent. An effective amount of reclaiming agent required depends on the type of rubber being devulcanized and the final product desired.

In addition to the foregoing ingredients, it will be apparent to those skilled in the art that a variety of other ingredients may be used that do not affect the essential nature of the resultant product. In fact, many such ingredients may be used to improve various properties for industrial acceptance. Typical ingredients include, but are not limited to, fillers, such as carbon black, coloring agents, aging inhibitors, processing lubricants, and mold release agents.

The following examples and tables are provided merely to illustrate the present invention, and it is to be understood the invention is not limited thereto. All amounts of the various ingredients in the examples and elsewhere in the specification are by weight unless otherwise specified.

EXAMPLE 1

| Reclaiming agent is comprised: of the following compounds in the given proportions: | |
|---|---|
| N-tert-butyl-2-benzothiazole sulphenamide (TBBS) | 3 |
| Zinc salt of 2-mercaptobenzothiazole (ZMBT) | 8 |
| Tetramethylthiuram monosulfide (TMTM) | 2 |
| 2-mercaptobenzothiazole (MBT) | 4 |
| Zinc salts of fatty acids (ZS) | 2 |
| Zinc oxide (ZnO) | 1 |
| Stearic acid (SA) | 1 |
| Sulfur (S) | 29 |
| | 50 |

The compounds are mixed together, forming a powder reclaiming agent. Fine mesh rubber crumb and reclaiming agent are combined in the specialized twin-screw extruder. One part of reclaiming agent per hundred parts of rubber crumb are mixed in the extruder. Rubber crumb and reclaiming agent are masticated in the extruder for approximately one to two minutes, while a temperature between about 75.degree. C. and about 85.degree. C. is maintained, thereby devulcanizing the rubber crumb. For comparison and testing purposes, the procedure is repeated using 2 parts of reclaiming agent per hundred parts of rubber crumb to yield a second devulcanized sample.

Each sample is tested for curing characteristics, cured at 320.degree. F. for ten minutes, and tested for physical properties. The results of the tests are shown in Tables 2 and 3.

TABLE 2

Curing Characteristics

| | 1% Reclaiming Agent | 2% Reclaiming Agent |
|---|---|---|
| Min. Torque (Ml) (lb-in) | 66.80 | 64.04 |
| Max. Torque (Mh) (lb-in) | 70.26 | 80.25 |
| Change in Torque (.DELTA.M) (lb-in) | 3.46 | 16.21 |
| Scorch Time (Ts2) (minutes) | 3.83 | 1.50 |
| Cure Rate (Tc95) (minutes) | 6.14 | 4.85 |

TABLE 3

Physical Properties when Cured at 320.degree. F. for 10 minutes

| | 1% Reclaiming Agent | 2% Reclaiming Agent |
|---|---|---|
| Hardness (Shore A) | 64 | 67 |
| Tensile Strength (psi) | 608 | 700 |
| Elongation at break (%) | 200 | 180 |
| 100% Modulus (psi) | 320 | 395 |
| Tear (Pli) | 68 | 71 |
| Specific Gravity (g/cm.sup.3) | 1.17 | 1.17 |

Devulcanized rubber from such process disclosed herein may be used directly, without binders to form 100% recycled rubber products. The resulting devulcanized rubber displays satisfactory characteristics. For example, a tensile strength above about 600 psi and an elongation percentage above about 150% generally indicate adequate vulcanization. Table 3 indicates that the present invention meets both of those requirements. Devulcanization according to present teachings is a significant achievement considering that most reclaimed rubbers must be blended with fresh rubber or other binders.

In addition, devulcanized rubber of the present invention may be combined with fresh compounds when higher physical properties are required. The amount of fresh compound added depends on the intended final use of the product. Depending on performance requirements, about 10% to about 50% of fresh compounds may be substituted by devulcanized rubber of the present invention without experiencing any significant loss of properties.

EXAMPLE 2

This Example demonstrates the effects of various accelerators when combined together in various ratios. TBBS, ZMBT, and TMTM are the accelerators tested. The process is similar to the process described in Example 1, except for the various accelerator combinations and ratios. The results of the tests are shown in Tables 4 and 5.

TABLE 4

Curing Characteristics

| Accelerator Combination | Accelerator Ratio | Ml | Mh | ΔM | Ts2 | Tc95 |
|---|---|---|---|---|---|---|
| TBBS/ZMBT | 3:3 | 63.82 | 72.34 | 8.52 | 2.00 | 4.52 |
| TBBS/ZMBT | 5:1 | 64.16 | 73.04 | 8.88 | 2.24 | 5.06 |
| TBBS/TMTM | 5:1 | 62.20 | 71.55 | 9.35 | 1.98 | 4.35 |
| TBBS/ZMBT | 1:5 | 66.80 | 70.26 | 3.46 | 3.83 | 6.14 |
| TBBS/ZMBT/TMTM | 2.7/2.7/0.6 | 61.28 | 71.30 | 10.02 | 1.67 | 4.25 |
| TBBS/ZMBT/TMTM | 4.4/1.0/0.6 | 62.88 | 73.48 | 10.60 | 1.88 | 4.43 |

TABLE 5

Physical Properties when Cured at 320. degree. F. for 10 minutes

| Accelerator Combination | Accelerator Ratio | Tensile (psi) | Elongation (%) | Modulus at 200% E (psi) | Tear (pli) | Duro (Shore A) | Specific Gravity (g/cm. sup. 3) |
|---|---|---|---|---|---|---|---|
| TBBS/ZMBT | 3:3 | 605 | 200 | 605 | 73 | 64 | 1.17 |
| TBBS/ZMBT | 5:1 | 620 | 210 | 610 | 78 | 64 | 1.16 |
| TBBS/TMTM | 5:1 | 610 | 204 | 608 | 73 | 64.5 | 1.16 |
| TBBS/ZMBT | 1:5 | 608 | 200 | 600 | 68 | 64 | 1.17 |
| TBBS/ZMBT/TMTM | 2.7/2.7/0.6 | 632 | 203 | 625 | 84 | 64.5 | 1.16 |
| TBBS/ZMBT/TMTM | 4.4/1.0/0.6 | 625 | 207 | 618 | 82 | 65 | 1.16 |

The results clearly show beneficial effects on physical properties when combining multiple accelerators. Overall, a ternary system TBBS/ZMBT/TMTM provides better results than a binary system TBBS/ZMBT or TBBS/TMTM. In addition, for binary systems, best results were achieved where the ratio for TBBS was high. A ratio for TBBS/ZMBT of 5:1 provides the best physical properties for binary systems.

EXAMPLE 3

This Example demonstrates the effects of testing reclaiming agent on factory scrap of nitrile rubber. Crumb from factory scrap of nitrile rubber is processed with the reclaiming agent on the extruder by the process described in examples 1 and 2. The reclaiming agent is utilized at 1.25 parts per 100 parts of crumb processed. The product is then revulcanized at 325.degree. F. for 12 minutes. The results are shown in Table 6.

TABLE 6

Physical Properties when Cured at 325. degree. F. for 12 minutes

| Material | Reclaiming Agent Ratio | Tensile (psi) | Elongation (%) | Modulus at 100% (psi) | Modulus at 300% (psi) | Tear (pli) | Duro (Shore A) |
|---|---|---|---|---|---|---|---|
| Nitrile scrap | 1.25:100 | 2170 | 366 | 360 | 1610 | 64 | 65 |

Table 6 indicates that sulfur-cured factory scrap, regardless of type of polymer, can provide much better physical properties than post-consumer scrap by processing with the process disclosed herein. The product shows satisfactory characteristics for most commercial and industrial applications.

While specific values, relationships, materials and steps have been set forth for purposes of describing concepts of the invention, it should be recognized that, in the light of the above teachings, those skilled in the art can modify those specifics without departing from basic concepts and operating principles of the invention taught herein. Therefore, for purposes of determining the scope of patent protection, reference shall be made to the appended claims in combination with the above detailed description.

What is claimed is:

1. A chemical composition for obtaining curable elastomeric material from a sulfur-cured, vulcanized elastomeric material, comprising:
    sulfur, wherein said sulfur comprises from about 40% to about 65% by weight of said chemical composition;
    a mixture of accelerators, including a first accelerator, a second accelerator, and a third accelerator wherein a weight percent ratio of said first accelerator to said second accelerator to said third accelerator ranges from about 3:3:1 to about 4:1:1; and
    an activating agent comprising from about 2% to about 6% by weight of said chemical composition.

2. A chemical composition for obtaining curable elastomeric material from a sulfur-cured, vulcanized elastomeric material, comprising:
    sulfur, wherein said sulfur comprises from about 40% to about 65% by weight of said chemical composition;
    a mixture of accelerators, including a first accelerator, a second accelerator, and a third accelerator wherein a weight percent ratio of said first accelerator to said second accelerator to said third accelerator ranges from about 2.7:2.7:0.6 to about 4.4:1.0:0.6; and
    an activating agent comprising from about 2% to about 6% by weight of said chemical composition.

3. The chemical composition as recited in claim 1 wherein said first accelerator is N-tert-butyl-2-benzoithiazole sulphenamide, said second accelerator is zinc 2-mercapto benzothiazole and said third accelerator is tetramethylthiuramic monosulphide.

4. The chemical composition as recited in claim 1 wherein said activating agent includes a zinc salt of a fatty acid, wherein said zinc salt of a fatty acid comprises from about 3% to about 6% by weight of said chemical composition.

5. The chemical composition as recited in claim 1 wherein said activating agent includes a mixture of zinc oxide and stearic acid.

6. The chemical composition as recited in claim 5 wherein said zinc oxide comprises from about 1% to about 3% by weight of said chemical composition and said stearic acid comprises from about 1% to about 3% by weight of said chemical composition.

7. The chemical composition as recited in claim 1 wherein said first accelerator is N-tert-butyl-2-benzoithiazole sulphenamide and said second accelerator is selected from the group consisting of zinc 2-mercapto benzothiazole and tetramethylthiuramic monosulphide and said mixture comprises about 34% by weight percent of said chemical composition.

8. The chemical composition as recited in claim 6 further including a third accelerator wherein said first accelerator is N-tert-butyl-2-benzoithiazole sulphenamide and said second accelerator is zinc 2-mercapto benzothiazole and said third accelerator is tetramethylthiuramic monosulphide.

9. The chemical composition as recited in claim 7 wherein said N-tert-butyl-2-benzoithiazole sulphenamide comprises from about 4% to about 10% by weight of said chemical composition, said zinc 2-mercapto benzothiazole comprises from about 4% to about 18% by weight of said chemical composition and said tetramethylthiuramic monosulphide comprises from about 3% to about 5% by weight of said chemical composition.

10. A process for obtaining curable elastomeric material from a sulfur-cured vulcanized elastomeric material, such curable elastomeric material being capable of being recompounded and recurred into a useful elastomeric product, comprising:
    reducing said sulfur-cured vulcanized elastomeric material to particle crumbs; and
    placing said particle crumbs and a chemical composition into a mill, said chemical composition comprising;
        sulfur, wherein said sulfur comprises from about 40% to about 65% by weight of said chemical composition;
        a mixture of accelerators, including a first accelerator, a second accelerator, and a third accelerator wherein a weight percent ratio of said first accelerator to said second accelerator to said third accelerator ranges from about 3:3:1 to about 4:1:1; and
        an activating agent comprising from about 2% to about 6% by weight of said chemical composition;
    applying a shearing force to said mixture of said particle crumbs and said chemical composition for a period of time equal to or less than about 2 minutes and at a temperature ranging from about 75° C. to about 85° C.

11. The process as recited in claim 10 wherein a ratio of said mixture of particle crumbs to said chemical composition comprises about 100 parts of said crumb and between about 1 to 2 parts said chemical composition.

12. The process as recited in claim 10 wherein said activating agent includes a zinc salt of a fatty acid, wherein said zinc salt of a fatty acid comprises from about 3% to about 6% by weight of said chemical composition.

13. The process as recited in claim 10 wherein said first accelerator is N-tert-butyl-2-benzoithiazole sulphenamide, said second accelerator is zinc 2-mercapto benzothiazole and said third accelerator is tetramethylthiuramic monosulphide.

14. The process as recited in claim 10 wherein said activating agent includes a mixture of zinc oxide and stearic acid.

15. The process as recited in claim 14 wherein said zinc oxide comprises from about 1% to about 3% by weight of said chemical composition and said stearic acid comprises from about 1% to about 3% by weight of said chemical composition.

16. The process as recited in claim 10 wherein said first accelerator is N-tert-butyl-2-benzoithiazole sulphenamide and said second accelerator is selected from the group consisting of zinc 2-mercapto benzothiazole and tetramethylthiuramic monosulphide and said mixture comprises from about 34% by weight percent of said chemical composition.

17. The process as recited in claim 16 further including a third accelerator wherein said first accelerator is N-tert-butyl-2-benzoithiazole sulphenamide and said second accelerator is zinc 2-mercapto benzothiazole and said third accelerator is tetramethylthiuramic monosulphide.

18. The process as recited in claim 17 wherein said N-tert-butyl-2-benzoithiazole sulphenamide comprises from about 4% to about 10% by weight of said chemical composition, said zinc 2-mercapto benzothiazole comprises from about 4% to about 18% by weight of said chemical composition and said tetramethylthiuramic monosulphide comprises from about 3% to about 5% by weight of said chemical composition.

* * * * *